US012800698B2

(12) United States Patent
Tang et al.

(10) Patent No.: US 12,800,698 B2
(45) Date of Patent: Nov. 17, 2026

(54) AUTOMATED CLIMBING INFORMATION ACQUISITION METHOD AND DEVICE, TERMINAL APPARATUS, AND STORAGE MEDIUM

(71) Applicant: GUANGDONG COROS SPORTS TECHNOLOGY JOINT STOCK COMPANY, Dongguan (CN)

(72) Inventors: Yu Tang, Dongguan (CN); Xiaohu Wang, Dongguan (CN); Zheng Wu, Dongguan (CN)

(73) Assignee: GUANGDONG COROS SPORTS TECHNOLOGY CO., LTD, Dongguan (CN)

( * ) Notice: Subject to any disclaimer, the term of this patent is extended or adjusted under 35 U.S.C. 154(b) by 288 days.

(21) Appl. No.: 18/619,497

(22) Filed: Mar. 28, 2024

(65) Prior Publication Data

US 2024/0264265 A1 Aug. 8, 2024

Related U.S. Application Data

(63) Continuation of application No. PCT/CN2021/122301, filed on Sep. 30, 2021.

(51) Int. Cl.

| | |
|---|---|
| ***G01S 5/02*** | (2010.01) |
| ***A63B 24/00*** | (2006.01) |
| ***A63B 29/00*** | (2006.01) |

(52) U.S. Cl.

CPC ........ *G01S 5/0284* (2013.01); *A63B 24/0006* (2013.01); *A63B 24/0062* (2013.01); *A63B 29/00* (2013.01); *A63B 2024/0025* (2013.01); *A63B 2220/62* (2013.01)

(58) Field of Classification Search

CPC ............... G01S 5/0284; G01S 2205/08; A63B 24/0006; A63B 24/0062; A63B 29/00

See application file for complete search history.

(56) References Cited

U.S. PATENT DOCUMENTS

| | | | | |
|---|---|---|---|---|
| 6,414,629 | B1 | 7/2002 | Curcio | |
| 2009/0305651 | A1 | 12/2009 | Kerwood | |
| 2016/0299230 | A1 | 10/2016 | Morris | |
| 2017/0034288 | A1 * | 2/2017 | Nakadaira | H04W 4/80 |
| 2019/0060736 | A1 | 2/2019 | Harris | |

FOREIGN PATENT DOCUMENTS

| | | |
|---|---|---|
| CN | 103200300 A | 7/2013 |

OTHER PUBLICATIONS

The World Intellectual Property Organization (WIPO) International Search Report for PCT/CN2021/122301 Jun. 1, 2022 5 Pages (including translation).
The European Patent Office (EPO) The Extended European Search Report for Application 21958925.6 Jun. 11, 2025 6 Pages.

* cited by examiner

*Primary Examiner* — Nabil H Syed
(74) *Attorney, Agent, or Firm* — ANOVA LAW GROUP, PLLC

(57) ABSTRACT

An automated climbing information acquisition method includes, in response to obtaining target information sent by a first terminal apparatus, determining relative information between a second terminal apparatus and the first terminal apparatus, and in response to the relative information satisfying a predetermined condition, the second terminal apparatus obtaining climbing information and performing a predetermined operation on the climbing information.

16 Claims, 5 Drawing Sheets

AUTOMATED CLIMBING INFORMATION ACQUISITION METHOD AND DEVICE, TERMINAL APPARATUS, AND STORAGE MEDIUM

CROSS-REFERENCE TO RELATED APPLICATION

This application is a continuation of International Application No. PCT/CN2021/122301, filed Sep. 30, 2021, the entire content of which is incorporated herein by reference.

TECHNICAL FIELD

The present disclosure generally relates to the climbing technology field and, more particularly, to an automated climbing information acquisition method and device, a terminal apparatus, and a storage medium.

BACKGROUND

Rock climbing is a sport of climbing upward on a natural or artificial rock wall, which is an extreme sport involving fitness, entertainment, and competition. Rock climbing can be categorized into natural rock climbing, which involves climbing on a naturally formed rock wall and requires prior cleaning and development of climbing routes, and climbing on an artificial rock, which involves climbing on a designed and constructed rock wall and includes an indoor climbing gym and an outdoor climbing field.

Due to the long length and high climbing difficulty of a natural rock climbing route, the climbing route needs to be divided into a plurality of segments to tackle one by one. A climber takes turns with a companion to be responsible for leading and protection. Rest points are set among the plurality of segments. The climber uses a smart wearable apparatus such as a smartwatch to record climbing information such as time spent for climbing each segment or height at a rest point. Thus, experience can be summarized to improve the climbing capability of the climber, or the climbing plan can be adjusted as needed.

However, to ensure the safety of the climber, the climber cannot wear a smartwatch. The smartwatch is placed in a pocket or hung on a safety rope. Thus, each time the climber reaches a rest point, the climber needs to take out the smartwatch to record the climbing information of the segment of the climbing route manually, which increases the load and climbing risk for the climber and causes various inconveniences.

SUMMARY

In accordance with the disclosure, there is provided a climbing information acquisition method. The method includes, in response to an operation of obtaining target information sent by a first terminal apparatus, determining relative information between a second terminal apparatus and the first terminal apparatus, and in response to the relative information satisfying a predetermined condition, the second terminal apparatus obtaining climbing information and performing a predetermined operation on the climbing information.

In accordance with the disclosure, there is provided a terminal apparatus, including one or more processors and one or more memories. The one or more memories store one or more computer programs that, when executed by the one or more processors, cause the one or more processors to, in response to an operation of obtaining target information sent by a first terminal apparatus, determine relative information between a second terminal apparatus and the first terminal apparatus, and in response to the relative information satisfying a predetermined condition, obtain climbing information and perform a predetermined operation on the climbing information.

In accordance with the disclosure, there is provided a computer-readable storage medium storing one or more computer programs that, when executed by one or more processors, cause the one or more processors to, in response to an operation of obtaining target information sent by a first terminal apparatus, determine relative information between a second terminal apparatus and the first terminal apparatus, and in response to the relative information satisfying a predetermined condition, obtain climbing information and perform a predetermined operation on the climbing information.

DETAILED DESCRIPTION OF THE EMBODIMENTS

The present disclosure is described in connection with the accompanying drawings and embodiments of the present disclosure. Embodiments of the present disclosure are merely used to explain the present disclosure. To facilitate description, the accompanying drawings only show a part related to the present disclosure.

Similar marks and letters are used to represent similar items in the accompanying drawings. Thus, once an item is defined in an accompanying drawing, the item may not need to be defined or described in the subsequent accompanying drawings. Meanwhile, in the description of the present disclosure, terms "first" and "second" are merely used to distinguish the descriptions and should not be considered as indicating or implying relative importance.

Figure 1:
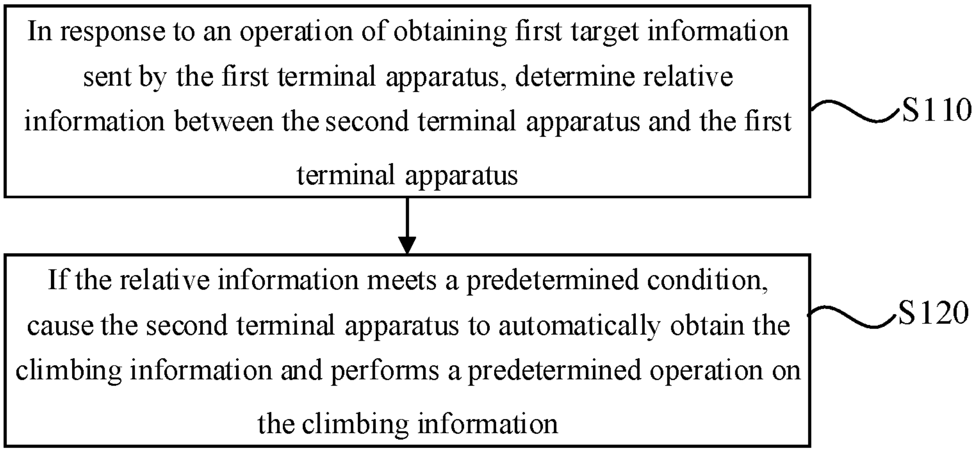
FIG. 1 is a schematic flowchart of an automated climbing information acquisition method according to some embodiments of the present disclosure.

FIG. 1 is a schematic flowchart of an automated climbing information acquisition method according to some embodiments of the present disclosure. The method of embodiments of the present disclosure can be applied to a situation in which the climber needs to automatically obtain the climbing information during climbing. The method can be performed by an automatic climbing information acquisition device of embodiments of the present disclosure. The device can be implemented by software and/or hardware. The device can be integrated into a second terminal apparatus or into a first terminal apparatus and the second terminal apparatus. The second terminal apparatus and the first terminal apparatus can be carried by the climber and the protector, respectively. The climber is a primary climbing person, and the protector is a secondary climbing person for protecting the climber. During climbing, the climber climbs in the front, and the protector protects the climber from behind. When reaching some selected positions on the climbing route, the climber and the protector can rest or communicate climbing skills. The terminal apparatus can record the climbing information such as the time length for the current climbing and climbing height to facilitate the climber to review or analyze the climbing information to gain experience or adjust the climbing plan.

As shown in FIG. 1, the method includes the following processes.

At S110, in response to an operation of obtaining first target information sent by the first terminal apparatus, relative information between the second terminal apparatus and the first terminal apparatus is determined.

The second terminal apparatus can obtain the first target information sent by the first terminal apparatus.

The first terminal apparatus and the second terminal apparatus can include a wearable apparatus such as an electronic watch, a wristband, a smart glass, and electronic apparatuses hanging on clothing.

A one-way communication from the first terminal apparatus to the second terminal apparatus or a two-way communication between the first terminal apparatus and the second terminal apparatus can be implemented through a connection method such as Bluetooth, broadcasting, near-field transmission, or Wi-Fi. The first target information can be determined based on the connection method between the second terminal apparatus and the first terminal apparatus. Thus, the transmission method of the first target information can include a radio-frequency signal, e.g., a Bluetooth signal or a broadcasting signal, or can be a near-field transmission signal, e.g., near-field communication (NFC) or radio frequency identification (RFID), or a WIFI signal.

For example, the second terminal apparatus can include an information receiver configured to receive the first target information sent by the first terminal apparatus. The first terminal apparatus can include an information transmission module configured to send the first target information. The second terminal apparatus can obtain the first target information sent by the first terminal apparatus by manually establishing a connection between the second terminal apparatus and the first terminal apparatus by a user to form an information interaction to obtain the first target information sent by the first terminal apparatus or setting a climbing mode to automatically establish the connection between the first terminal apparatus and the second terminal apparatus when the climber activates the climbing mode to form the information interaction, which is not limited in embodiments of the present disclosure.

The relative information between the second terminal apparatus and the first terminal apparatus can be information determined according to the interaction behavior between the two terminal apparatuses or based on the information obtained by the first terminal apparatus and the second terminal apparatus.

For example, the relative information can include a relative position between the second terminal apparatus and the first terminal apparatus, a relative distance between the second terminal apparatus and the first terminal apparatus, a relative trajectory length difference, or signal strength of a signal including information sent by the first terminal apparatus received by the second terminal apparatus.

For example, determining the relative information between the second terminal apparatus and the first terminal apparatus can include, after the second terminal apparatus obtains the first target information sent by the first terminal apparatus, the second terminal apparatus determining the relative information between the second terminal apparatus and the first terminal apparatus according to the obtained first target information, or when the second terminal apparatus obtains the first target information sent by the first terminal apparatus, the obtaining operation triggering the second terminal apparatus to determine the relative information between the second terminal apparatus and the first terminal apparatus. The operation of obtaining the first target information can only trigger the determination of the relative information. The first target information may not be substantially related to the relative information.

At S120, if the relative information meets a predetermined condition, the second terminal apparatus automatically obtains the climbing information and performs a predetermined operation on the climbing information.

The predetermined condition can refer to a condition corresponding to the relative information. The predetermined condition can be pre-set by a developer or set by a user according to the obtained relative information. The climbing information can be any information obtained by the climber through the second terminal apparatus during climbing. The climbing information can include climbing data of the climber, e.g., a climbing time length, a current climbing segment, a current climbing difficulty coefficient corresponding to the current climbing segment, and a climbing trajectory, or health data of the climber, e.g., a heart rate, pulse, or body temperature of the climber.

When the relative information meets the predetermined condition, the second terminal apparatus automatically can obtain the climbing information and perform a predetermined operation on the climbing information. The predetermined operation can be at least one of a storage operation, a statistical analysis operation, or an output operation on the climbing information. By automatically obtaining the climbing information and performing the predetermined operation on the climbing information during the climbing process of the climber, a plurality of types of important information during the climbing process can be automatically recorded for the climber to prevent the climber from frequently operating the terminal apparatus.

In the technical solution of the present disclosure, in response to the operation of obtaining the first target information sent by the first terminal apparatus, the relative information between the second terminal apparatus and the first terminal apparatus can be determined. If the relative information meets the predetermined condition, the second terminal apparatus can automatically obtain the climbing information and perform the predetermined operation on the climbing information once to automatically obtain the climbing information of the climber during climbing. Thus, the climber may not need to manually record the climbing information. The climber can more focus and enjoy the climbing process to reduce climbing load and climbing risk and improve the climbing experience of the climber.

In some embodiments, the first target information can include at least one of an identification number of the first terminal apparatus, the current position corresponding to the first terminal apparatus, or the current trajectory of the first terminal apparatus.

The identification number of the first terminal apparatus can be used to identify the identity information of the first terminal apparatus. The current position corresponding to the first terminal apparatus can be the position determined by the positioning device of the first terminal apparatus, for example, positioning with a Global Positioning System (GPS). The current trajectory of the first terminal apparatus can be the current trajectory determined according to the obtained positioning information at a predetermined time interval.

Figure 2:
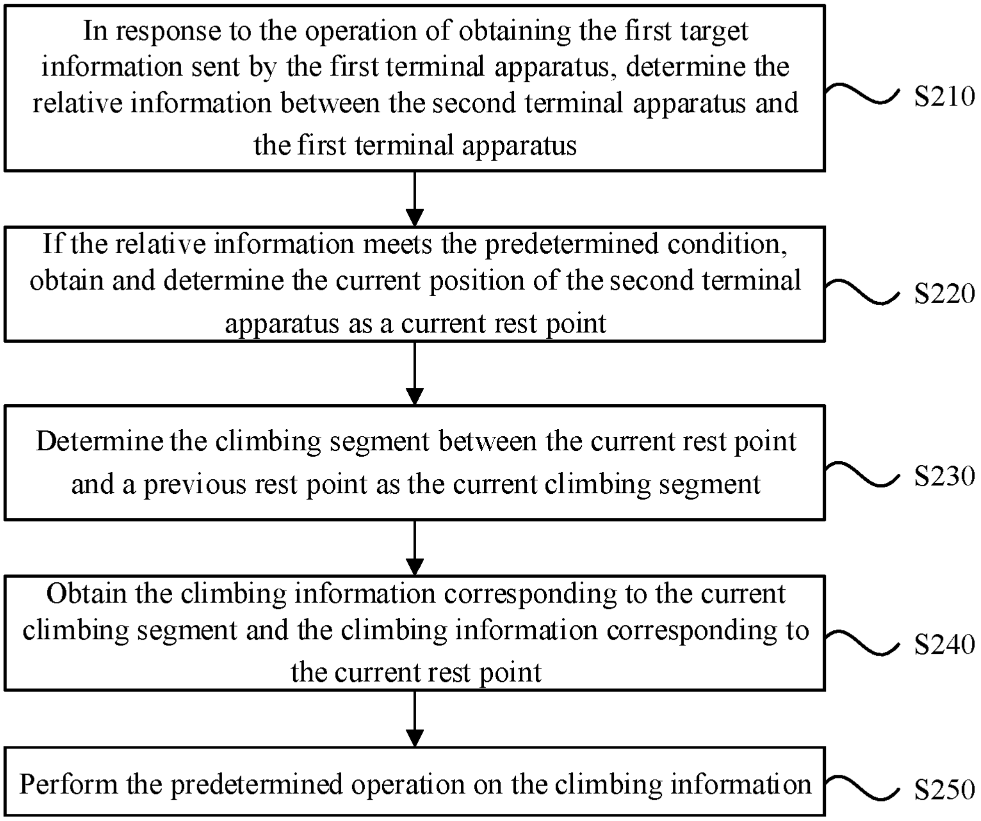
FIG. 2 is a schematic flowchart of an automated climbing information acquisition method according to some embodiments of the present disclosure.

FIG. 2 is a schematic flowchart of an automated climbing information acquisition method according to some embodiments of the present disclosure. Based on the above embodiment, process S120 of the second terminal apparatus automatically obtaining the climbing information is further described.

As shown in FIG. 2, the method of embodiments of the present disclosure includes the following processes.

At S210, in response to the operation of obtaining the first target information sent by the first terminal apparatus, the relative information between the second terminal apparatus and the first terminal apparatus is determined.

At S220, if the relative information meets the predetermined condition, the current position of the second terminal apparatus is obtained and determined as a current rest point.

Since outdoor climbing often takes hours or even days to complete, climbers often divide the climbing route into several segments to dozens of segments to complete the segments one by one. After each climbing segment, the climbers can take a brief rest for status adjustment, and can even eat or sleep to supplement energy. According to the climbing habits of the climbers, the climbers can often record the climbing information during the rest and discuss and make the subsequent climbing plan with a companion according to the climbing information. Thus, in embodiments of the present disclosure, the predetermined condition can be set as the condition that is met by the relative information between the second terminal apparatus and the first terminal apparatus when the climber and the companion are at the rest point.

If the relative information satisfies the predetermined condition, the current position of the second terminal apparatus is obtained and determined as the current rest point to obtain a position of each rest point.

At S230, the climbing segment between the current rest point and a previous rest point is determined as the current climbing segment.

The climbing route can be divided into a plurality of climbing segments. A climbing route between two neighboring rest points can be a climbing segment. The climbing segment between the current rest point and the previous rest point can be determined as the current climbing segment.

A climbing starting position can be considered as a first rest point. A climbing ending position can be considered as a last rest point. If the climbing route is divided into n climbing segments, n+1 rest points can exist.

At S240, the climbing information corresponding to the current climbing segment and the climbing information corresponding to the current rest point are obtained.

In some embodiments, the climbing information corresponding to the current climbing segment can include climbing time, a climbing difficulty coefficient, a current climbing trajectory, and a trajectory length corresponding to the current climbing trajectory. The climbing information corresponding to the current rest point can include a current climbing height and rest time. The rest time can be first duration in which the relative information satisfies the predetermined condition.

The climbing information corresponding to the current climbing segment can include the climbing time, the climbing difficulty coefficient, the current climbing trajectory, and the trajectory length corresponding to the current climbing trajectory. The climbing difficulty coefficient can be the difficulty coefficient corresponding to the current climbing segment. Since climbing conditions of different rock walls are quite different, climbing conditions of a plurality of segments in a same climbing route can also be quite different. The climbing difficulty coefficient can be often used to assess the climbing difficulty level for each segment and the whole climbing process. The climbing difficulty coefficient can be determined and published by a professional climber according to the climbing difficulty rating standard after completing a climbing segment. Since the climbing difficulty rating has a complete and strict rating standard, and the rater has accumulated extensive climbing experience, the climbing difficulty coefficient can be referred to by future climbers to assess their climbing capability based on the difficulty of each climbing segment.

The climbing information corresponding to the current rest point can include the current climbing height and the rest time. When the current climbing height is the height corresponding to the current rest point, the rest time can be the time of the second terminal apparatus carried by the climber staying at the current rest point. That is, the relative information can satisfy the first duration of the predetermined condition.

At S250, the predetermined operation is performed on the climbing information once.

In some embodiments, the predetermined operation can include at least one of the storage operation, the statistical analysis operation, or the output operation.

The storage operation can include sending the climbing information to the server or cloud end for storage. The statistical analysis operation can include performing statistical analysis on the climbing information. The output operation can include displaying, audio broadcasting, or exporting the climbing information. The predetermined operation can be performed on the climbing information once. The predetermined operation can include any one or more of the storage operation, the statistical analysis operation, or the output operation.

In some embodiments, the storage operation can be performed on the climbing information corresponding to the current climbing segment, such as the climbing time, the climbing difficulty coefficient, the current climbing trajectory, the trajectory length corresponding to the current climbing trajectory, the current climbing height, and the rest time. The statistical analysis operation can be performed on the climbing information to obtain total climbing time, total rest time, a maximum climbing height, and a maximum climbing difficulty coefficient. Then, the storage operation and the audio broadcasting operation can be performed on the information obtained by the statistical analysis.

In some other embodiments, a trajectory chart with difficulty coefficients and time identification can be formed according to the climbing time, the climbing difficulty coefficient, and the current climbing trajectory corresponding to the current climbing segment. The trajectory chart can be then displayed.

In the technical solution of embodiments of the present disclosure, in response to the operation of obtaining the first target information sent by the first terminal apparatus, the relative information between the second terminal apparatus and the first terminal apparatus can be determined. If the relative information meets the predetermined conditions, the current position of the second terminal apparatus can be determined as the current rest point. The climbing segment between the current rest point and the previous rest point can be determined as the current climbing segment. The climbing information corresponding to the current climbing segment and the climbing information corresponding to the current rest point can be obtained. Then, the climbing information of the climber in the previous climbing segment can be automatically obtained when the climber is at the rest point without the climber manually recording the climbing information. Thus, the climber can more focus on and enjoy the climbing process, which reduces the climbing load and climbing risk and improves the climbing experience of the climber. The predetermined operation can be performed on the climbing information, including at least one of the storage operation, the statistical analysis operation, or the output operation. Thus, the climber can accurately know changes in a plurality of items of the climbing information to allow the climber to scientifically make and adjust the climbing plan according to the climbing information.

Figure 3A:
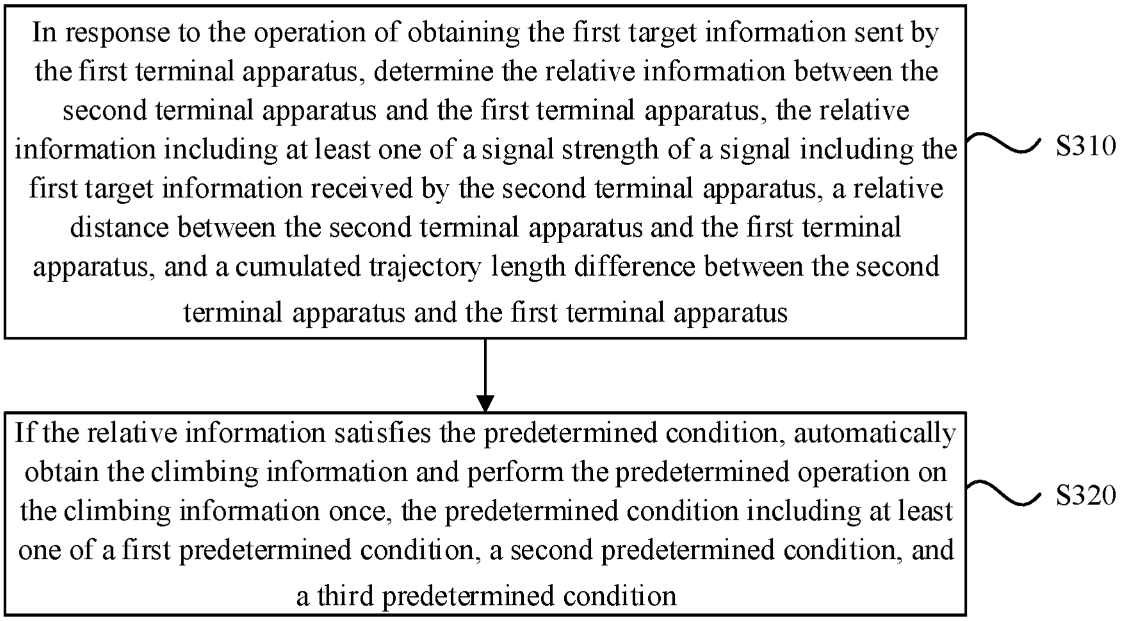
FIG. 3A is a schematic flowchart of an automated climbing information acquisition method according to some embodiments of the present disclosure.

FIG. 3A is a schematic flowchart of an automated climbing information acquisition method according to some embodiments of the present disclosure. Based on the above embodiments, process S110 of determining the relative information between the second terminal apparatus and the first terminal apparatus is described.

As shown in FIG. 3A, the method of embodiments of the present disclosure includes the following processes.

At S310, in response to the operation of obtaining the first target information sent by the first terminal apparatus, the relative information between the second terminal apparatus and the first terminal apparatus is determined. The relative information includes at least one of a signal strength of a signal including the first target information received by the second terminal apparatus, a relative distance between the second terminal apparatus and the first terminal apparatus, and a cumulated trajectory length difference between the second terminal apparatus and the first terminal apparatus.

The signal strength of the signal including the first target information received by the second terminal apparatus can be a signal strength of a signal including the first target information sent by the first terminal apparatus and received by the second terminal apparatus. The signal strength can be inversely proportional to the distance between the first terminal apparatus and the second terminal apparatus.

The cumulated trajectory length difference between the second terminal apparatus and the first terminal apparatus can be determined based on the first trajectory length corresponding to the current climbing trajectory of the first terminal apparatus in the first target information and the second trajectory length corresponding to the current climbing trajectory of the second terminal apparatus obtained by the second terminal apparatus.

The relative distance between the second terminal apparatus and the first terminal apparatus can be determined based on the current position information of the first terminal apparatus in the first target information and the current position information of the second terminal apparatus obtained by the second terminal apparatus, or according to the signal strength of the first target information received by the second terminal apparatus.

For example, a calculation formula for determining the relative distance between the second terminal apparatus and the first terminal apparatus according to the signal strength of the signal including the first target information received by the second terminal apparatus is:

$$d = 10^{\frac{RSSI-A}{10n}};$$

where d is the relative distance between the second terminal apparatus and the first terminal apparatus with a unit in meters, RSSI is the signal strength of the signal including the first target information received by the second terminal apparatus with a unit in dBm, A is the signal strength of the signal including the first target information received by the second terminal apparatus at 1 meter, and n is a transmission constant ranging between 2.7 and 4.3.

In some embodiments, determining the relative distance between the second terminal apparatus and the first terminal apparatus based on the current position information of the first terminal apparatus and the current position information of the second terminal apparatus obtained by the second terminal apparatus can include a straight-line distance between the second terminal apparatus and the first terminal apparatus or a height difference between the second terminal apparatus and the first terminal apparatus.

Figure 3B:
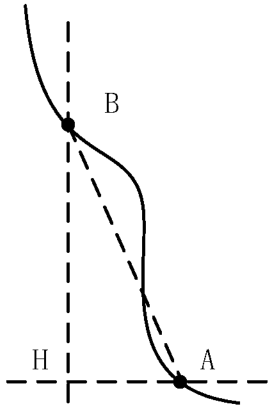
FIG. 3B is a schematic flowchart of an automated climbing information acquisition method according to some embodiments of the present disclosure.

For example, as shown in FIG. 3B, the straight-line distance between the second terminal apparatus and the first terminal apparatus is a length of line segment AB, where point A represents the first terminal apparatus, and point B represents the second terminal apparatus. The height difference between the second terminal apparatus and the first terminal apparatus is a length of line segment BH, where H is a perpendicular point from point B to point A on the horizontal line.

At S320, if the relative information satisfies the predetermined condition, the second terminal apparatus automatically obtains the climbing information and performs the predetermined operation on the climbing information once. The predetermined condition includes at least one of a first predetermined condition, a second predetermined condition, and a third predetermined condition.

The first predetermined condition can be a predetermined condition corresponding to the signal strength of the signal including the first target information received by the second terminal apparatus. The second predetermined condition can be a predetermined condition corresponding to the relative distance between the second terminal apparatus and the first terminal apparatus. The third predetermined condition can be a condition corresponding to the cumulated trajectory length difference between the second terminal apparatus and the first terminal apparatus.

In the technical solution of embodiments of the present disclosure, in response to the operation of obtaining the first target information sent by the first terminal apparatus, the relative information between the second terminal apparatus and the first terminal apparatus can be determined based on at least one of the signal strength of the signal including the first target information received by the second terminal apparatus, the relative distance between the second terminal apparatus and the first terminal apparatus, and the cumulated trajectory length difference between the second terminal apparatus and the first terminal apparatus. If the relative information satisfies the predetermined condition, the second terminal apparatus can automatically obtain the climbing information and perform the predetermined operation on the climbing information once. When at least one of the signal strength of the signal including the first target information received by the second terminal apparatus, the relative distance between the second terminal apparatus and the first terminal apparatus, and the cumulated trajectory length difference between the second terminal apparatus and the first terminal apparatus satisfies the predetermined condition, the climbing information of the climber during the climbing process can be automatically obtained to improve the accuracy of the acquisition of the climbing information. Thus, the climber can more focus on and enjoy the climbing process, which reduces the climbing load and climbing risk and improves the climbing experience of the climber.

In some embodiments, if the relative information includes the signal strength of the signal including the first target information received by the second terminal apparatus, and the predetermined condition includes the first predetermined condition, the first predetermined condition can include the signal strength being greater than a first strength threshold.

If the relative information includes the relative distance between the second terminal apparatus and the first terminal apparatus, and the predetermined condition includes the second predetermined condition, the second predetermined condition can include the relative distance being less than a distance threshold.

If the relative information includes the cumulated trajectory length difference between the second terminal apparatus and the first terminal apparatus, and the predetermined condition includes the third predetermined condition, the third predetermined condition can include the cumulated trajectory length difference being less than a length threshold.

The first strength threshold, the distance threshold, and the length threshold can be predetermined by the developer based on historical test results or experience, or set by the user according to the climbing habits or the obtained relative information, which is not limited in embodiments of the present disclosure.

For example, companions often gather at a rest point during multi-segment climbing sports, the distance between the two terminal apparatuses can be small. Thus, a small predetermined relative distance can be determined as the distance threshold, and the signal strength corresponding to the small predetermined relative distance can be determined as the first strength threshold.

For another example, the climber climbs in front during climbing, and the protector climbs behind the climber at a certain distance to protect the climber. When the terminal apparatuses carried by the climber and the protector have the same climbing trajectory, the two terminal apparatuses can be considered to be at a same rest point, and the climbing information can be obtained. However, the climbing trajectories of the climber and the protector can be not completely the same during climbing, the cumulated trajectory length difference can exist between the second terminal apparatus and the first terminal apparatus. Since the climbing is limited by the climbing route, the cumulated trajectory length difference can be within a controllable range. Thus, the length threshold can be set. When the cumulated trajectory length difference between the second terminal apparatus and the first terminal apparatus is smaller than the determined length threshold, the two terminal apparatuses can be considered to be at the same rest point.

In some embodiments, the first predetermined condition can further include second duration in which the signal strength is greater than the first strength threshold being greater than the first time threshold. The second predetermined condition can further include third duration in which the relative distance is less than the distance threshold being greater than the first time threshold. The third predetermined condition can further include fourth duration in which the cumulated trajectory length difference is less than the length threshold being greater than the first time threshold.

During outdoor climbing, the signal strength of the signal including the first target information received by the second terminal apparatus can be deteriorated and distorted due to a transmission factor. Thus, the relative information between the second terminal apparatus and the first terminal apparatus may not be accurate. Therefore, based on the predetermined condition, a time dimension can be introduced to limit the duration in which the relative information satisfies the threshold.

The first predetermined condition can include the signal strength being greater than the first strength threshold, and the second duration in which the signal strength is greater than the first strength threshold being greater than the first time threshold. The second predetermined condition can include the relative distance being less than the distance threshold, and the third duration in which the relative distance is less than the distance threshold being greater than the first time threshold. The third predetermined condition can include the cumulated trajectory length difference being less than the length threshold, and the fourth duration in which the cumulated trajectory length difference is less than the length threshold being greater than the first time threshold.

In some embodiments, the first predetermined condition can further include, within the predetermined time, a proportion of the second duration in which the signal strength is greater than the first strength threshold being greater than a first predetermined ratio. In this disclosure, a proportion of a duration within the predetermined time refers to the ratio of the duration to the predetermined time. For example, the proportion of the second duration within the predetermined time refers to the ratio of the second duration to the predetermined time. The second predetermined condition can further include, within the predetermined time, a proportion of the third duration in which the distance is greater than the distance threshold being greater than a second predetermined ratio. The third predetermined condition can further include, within the predetermined time, a proportion of the fourth duration in which the cumulated trajectory length difference is less than the length threshold being greater than a third predetermined ratio.

Since the signal strength and quality of the signal including the first target information received by the second terminal apparatus constantly change due to environmental influences, the relative information between the two terminal apparatuses at a moment within the predetermined time may not satisfy the value threshold (strength threshold, distance threshold, or length threshold) condition. Thus, the duration in which the relative information satisfies the value threshold condition cannot satisfy the time threshold. Therefore, the relative information can be determined to not satisfy the predetermined condition. To eliminate the impact of a discrete value at a certain moment, an additional determination condition can be added. That is, the proportion of the duration to the predetermined time is greater than the predetermined ratio.

The predetermined time can be preset by the developer based on the historical test results or experience, or set by the user according to the climbing habits or the obtained relative information, which is not limited in embodiments of the present disclosure.

The first predetermined condition can include the signal strength being greater than the first strength threshold, the second duration in which the signal strength is greater than the first strength threshold being greater than the first time threshold, and within the predetermined time, the proportion of the second duration in which the signal strength is greater than the first strength threshold being greater than the first predetermined ratio. The second predetermined condition can include the relative distance being less than the distance threshold, the third duration in which the relative distance is less than the distance threshold being greater than the first time threshold, and within the predetermined time, the proportion of the third duration in which the relative distance is smaller than the distance threshold being greater than the second predetermined ratio. The third predetermined condition can include the cumulated trajectory length difference being less than the length threshold, the fourth duration in which the cumulated trajectory length difference is less than the length threshold being greater than the first time threshold, and within the predetermined time, the proportion of the fourth duration in which the cumulated trajectory length difference is less than the length threshold being greater than the third predetermined ratio.

Figure 4:
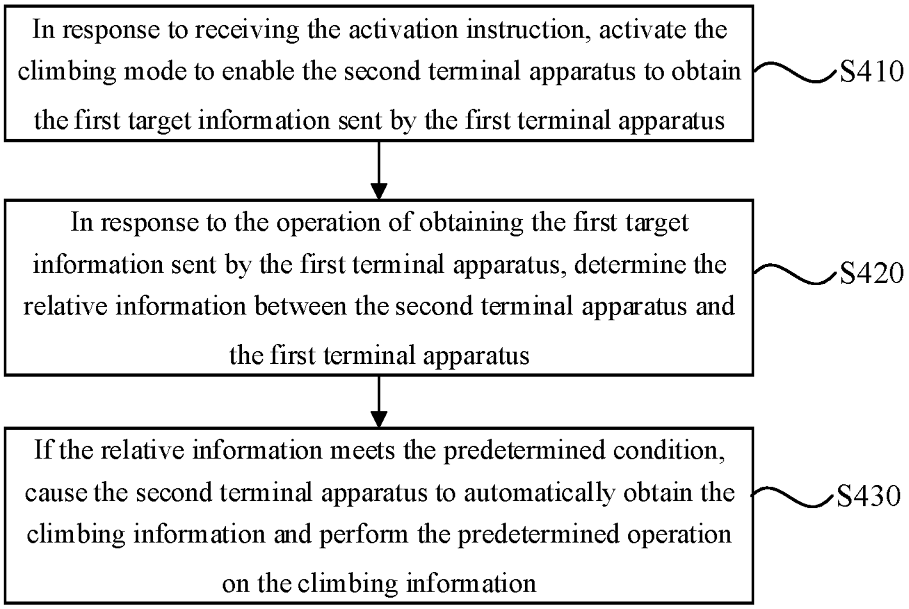
FIG. 4 is a schematic flowchart of an automated climbing information acquisition method according to some embodiments of the present disclosure.

FIG. 4 is a schematic flowchart of an automated climbing information acquisition method according to some embodiments of the present disclosure. Based on the above embodiments, before obtaining the first target information sent by the first terminal apparatus, the method further includes activating the climbing mode in response to receiving an activation instruction to cause the second terminal apparatus to obtain the first target information sent by the first terminal apparatus.

As shown in FIG. 4, the method of embodiments of the present disclosure includes the following processes.

At S410, in response to receiving the activation instruction, the climbing mode is activated to enable the second terminal apparatus to obtain the first target information sent by the first terminal apparatus.

The activation instruction can be a key-triggered instruction, an audio control instruction, or a screen-triggered instruction, which is not limited in embodiments of the present disclosure.

Since outdoor climbing takes a long time, and for the safety and experience of the climber, items that can be carried are limited, battery life of the terminal apparatus carried by the climber can be very important. When the second terminal apparatus does not enter the climbing mode, the second terminal apparatus may not obtain the first target information sent by the first terminal apparatus. When receiving the activation instruction, the second terminal apparatus can activate the climbing mode and scan and connect the first terminal apparatus to start obtaining the first target information sent by the first terminal apparatus. Thus, energy consumption can be reduced, and the battery life of the terminal apparatus can be improved.

At S420, in response to the operation of obtaining the first target information sent by the first terminal apparatus, the relative information between the second terminal apparatus and the first terminal apparatus is determined.

At S430, if the relative information meets the predetermined condition, the second terminal apparatus automatically obtains the climbing information and performs the predetermined operation on the climbing information.

In the technical solution of the present disclosure, the climbing mode can be activated when the activation instruction is received to cause the second terminal apparatus to obtain the first target information sent by the first terminal apparatus. In response to the operation of obtaining the first target information sent by the first terminal apparatus, the relative information between the second terminal apparatus and the first terminal apparatus can be determined. If the relative information satisfies the predetermined condition, the second terminal apparatus can automatically obtain the climbing information and perform the predetermined operation on the climbing information. Thus, after entering the climbing mode, the second terminal apparatus can automatically obtain the climbing information of the climber during climbing to improve the accuracy of the acquisition of the climbing information. Thus, the climber can more focus on and enjoy the climbing process. The climbing load can be reduced, the climbing risk can be lowered, and the climbing experience of the climber can be improved. In addition, the energy consumption can be reduced to improve the battery life of the terminal apparatus.

In some embodiments, the method can further include exiting the climbing mode when receiving an ending instruction or the duration in which the relative information satisfies the predetermined condition is greater than the second time threshold. When a pause instruction is received, the climbing mode can be paused to cause the second terminal apparatus to stop obtaining the first target information sent by the first terminal apparatus. When a resume instruction is received, the climbing mode can be continued to cause the second terminal apparatus to continue to obtain the first target information sent by the first terminal apparatus.

To meet various user needs, the user can control the second terminal apparatus to exit, pause, or resume the climbing mode through instructions. The ending instruction, the pause instruction, and the resume instruction can be key-triggered instructions, audio control instructions, or screen-triggered instructions, which are not limited in the present disclosure.

To reduce the energy consumption of the terminal apparatus and ensure the battery life of the terminal apparatus, if the duration in which the relative information satisfies the predetermined condition is greater than the second time threshold, the two terminal apparatuses can be considered to have a close distance or be at the same height for a long time. Then, the climber can be considered as completing climbing, and the second terminal apparatus can automatically exit the climbing mode. The second time threshold can be used to determine whether the two terminal apparatuses end climbing. The second time threshold can be greater than the first time threshold. The second time threshold can be preset by the developer according to the historical test results or experience, or set by the user according to the climbing habits, the actual needs, or the obtained relative information.

Figure 5:
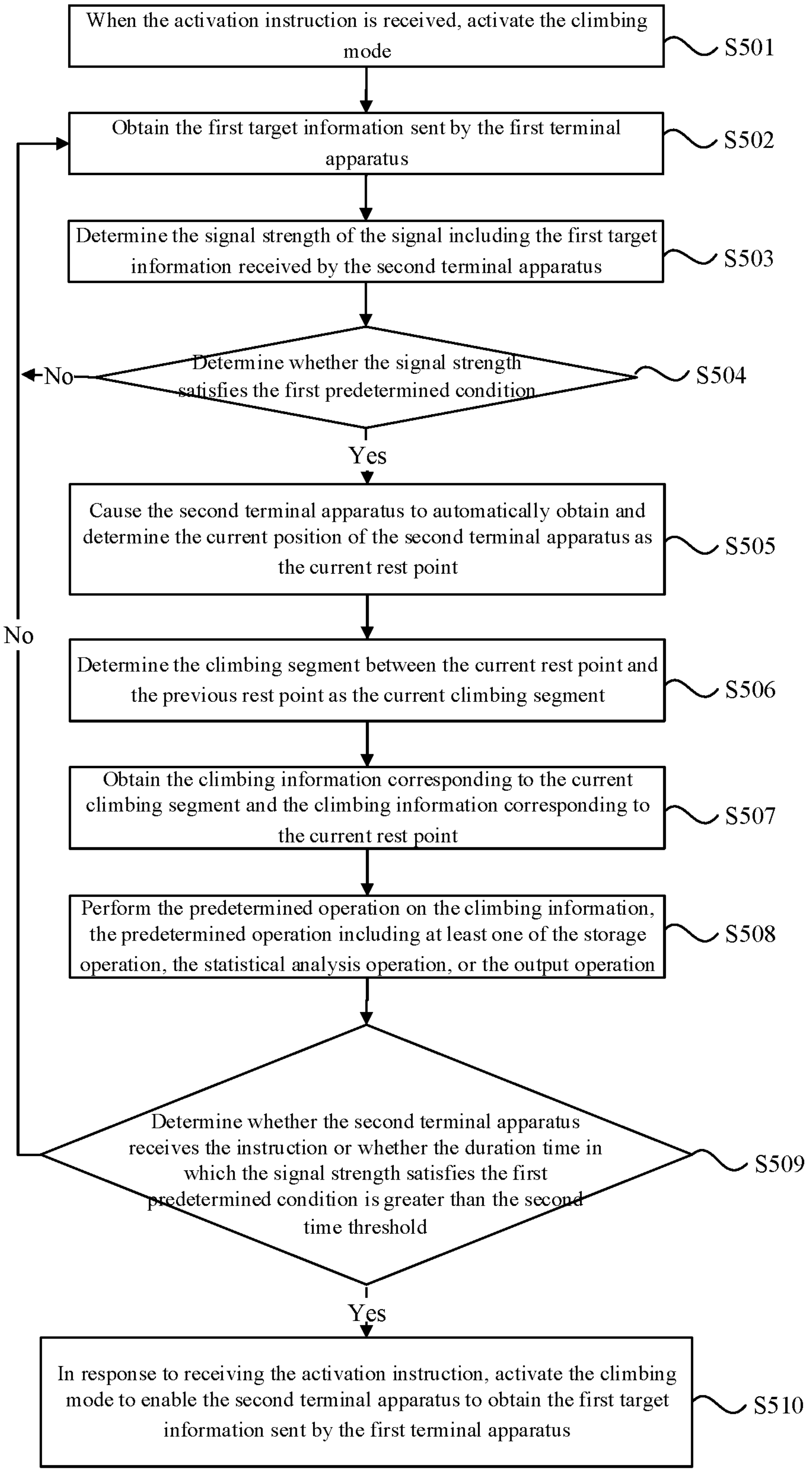
FIG. 5 is a schematic flowchart of an automated climbing information acquisition method according to some embodiments of the present disclosure.

FIG. 5 is a schematic flowchart of an automated climbing information acquisition method according to some embodiments of the present disclosure. By taking the relative information between the second terminal apparatus and the first terminal apparatus as the signal strength of the signal including the first target information received by the second terminal apparatus as an example, the implementation process of the method of the second terminal apparatus automatically obtaining the climbing information according to the signal strength of the signal including the first target information sent by the first terminal apparatus is described. The relative information can include at least one of the signal strength of the signal including the first target information received by the second terminal apparatus, the relative distance between the second terminal apparatus and the first terminal apparatus, or the cumulated trajectory length difference between the second terminal apparatus and the first terminal apparatus. Except that the predetermined condition can change, other processes are the same and are not repeated here. As shown in FIG. 5, the method for the second terminal apparatus automatically obtaining the climbing information according to the signal strength of the signal including the first target information sent by the first terminal apparatus includes the following processes.

At S501, when the activation instruction is received, the climbing mode is activated.

When the second terminal apparatus receives the activation instruction, the climbing mode can be activated to cause the second terminal apparatus to establish information interconnection with the first terminal apparatus through Bluetooth scanning. The second terminal apparatus can be carried by the climber, and the first terminal apparatus can be carried by the protector.

At S502, the first target information sent by the first terminal apparatus is obtained.

After establishing the information interconnection between the first terminal apparatus and the second terminal apparatus, the second terminal apparatus can obtain the first target information sent by the first terminal apparatus. The first target information can include the identification number of the first terminal apparatus used to perform identity authentication on the first terminal apparatus.

At S503, the signal strength of the signal including the first target information received by the second terminal apparatus is determined.

When the first target information sent by the first terminal apparatus is received, the signal strength of the signal including the first target information received by the second terminal apparatus can be determined.

At S504, whether the signal strength meets the first predetermined condition is determined.

The first predetermined condition can include the signal strength being greater than the first strength threshold.

To avoid the distortion of the signal strength of the signal including the first target information received by the second terminal apparatus caused by deterioration because of the transmission factors, the first predetermined condition can further include the second duration in which the signal strength is greater than the first strength threshold being greater than the first time threshold. To eliminate the impact of the discrete values at some moments, the first predetermined condition can further include the proportion of the second duration in which the signal strength is greater than the first strength threshold within the predetermined time being greater than the first predetermined ratio.

If the signal strength meets the first predetermined condition, process S505 is performed. If the signal strength does not meet the first predetermined condition, the method returns to process S502 to continue obtaining the first target information sent by the first terminal apparatus.

At S505, the second terminal apparatus automatically obtains and determines the current position of the second terminal apparatus as the current rest point.

If the signal strength of the signal including the first target information received by the second terminal apparatus is greater than the first strength threshold, the second terminal apparatus can automatically obtain and determine the current position of the second terminal apparatus as the current rest point.

At S506, the climbing segment between the current rest point and the previous rest point is determined as the current climbing segment.

At S507, the climbing information corresponding to the current climbing segment and the climbing information corresponding to the current rest point are obtained.

The climbing information corresponding to the current climbing segment can include the climbing time, the climbing difficulty coefficient, the current climbing trajectory, and the trajectory length corresponding to the current climbing trajectory. The climbing information corresponding to the current rest point can include the current climbing height and the rest time. The rest time can be the first duration in which the signal strength of the signal including the first target information received by the second terminal apparatus satisfies the first predetermined condition.

At S508, the predetermined operation is performed on the climbing information and includes at least one of the storage operation, the statistical analysis operation, or the output operation.

For example, the statistical analysis can be performed on the climbing information corresponding to the current climbing segment and the climbing information corresponding to the current rest point to obtain the cumulated climbing time, the cumulated climbing trajectory, and the cumulated climbing trajectory length for the plurality of climbing segments, as well as the cumulated climbing height and the cumulated rest time for the plurality of rest points. According to the above statistical analysis results, a climbing trajectory diagram or a climbing information record table can be created for the climber. The climbing information such as the climbing time and climbing height corresponding to each rest point and the climbing time and climbing difficulty coefficient corresponding to each climbing segment can be marked on the climbing trajectory diagram. The climbing information and the statistical analysis results of the climbing information can be stored in the second terminal apparatus or a cloud server. The climbing information such as the climbing trajectory length and the rest time corresponding to the current rest point can be displayed at the second terminal apparatus and audio-broadcasted. Thus, the climber can obtain the climbing information and know the climbing progress without manually recording or reviewing. Therefore, the climber can focus more on and enjoy the climbing process, which reduces the climbing load and lowers the climbing risk.

At S509, whether the second terminal apparatus receives the instruction or whether the duration in which the signal strength satisfies the first predetermined condition is greater than the second time threshold is determined. If the second terminal apparatus does not receive the instruction and the duration in which the signal strength satisfies the first predetermined condition is not greater than the second time threshold, the method returns to process S502 to continue obtaining the first target information sent by the first terminal apparatus. If the second terminal apparatus receives the instruction or the duration in which the signal strength satisfies the first predetermined condition is greater than the second time threshold, process S510 is performed.

At S510, if the second terminal apparatus receives the ending instruction or if the duration in which the signal strength satisfies the first predetermined condition is greater than the second time threshold, the second terminal apparatus exits the climbing mode. When the second terminal apparatus receives the pause instruction, the second terminal apparatus pauses the climbing mode. When the second terminal apparatus receives the resume instruction, the second terminal apparatus continues with the climbing mode.

When the second terminal apparatus receives the ending instruction or the duration in which the signal strength satisfies the first predetermined condition is greater than the second time threshold, the second terminal apparatus can exit the climbing mode and stop obtaining the first target information sent by the first terminal apparatus. The second terminal apparatus can pause, resume, or end the climbing mode according to the instruction of the user to satisfy the user needs. Whether the climber completes the climbing process can be automatically determined according to the signal strength. If the duration in which the signal strength satisfies the first predetermined condition is greater than the second time threshold, the second terminal apparatus can exit the climbing mode to reduce the energy consumption of the terminal apparatus and ensure the battery life of the terminal apparatus.

In embodiments of the present disclosure, the second terminal apparatus can activate the climbing mode to obtain the first target information sent by the first terminal apparatus and determine the signal strength of the signal including the first target information received by the second terminal apparatus. If the signal strength satisfies the first predetermined condition, the second terminal apparatus can automatically obtain the climbing information and perform the predetermined operation on the climbing information. The second terminal apparatus can pause, resume, or end the climbing mode based on the instruction of the user or exit the climbing mode when the duration in which the signal strength satisfies the first predetermined condition is greater than the second time threshold. The second terminal apparatus can automatically obtain the climbing information in the climbing mode, and the climber may not need to manually record the climbing information. Thus, the climber can more focus on and enjoy the climbing process, which reduces the climbing load and lowers the climbing risk to improve the climbing experience of the climber. The second terminal apparatus can pause, resume, and end the climbing mode based on the instruction of the user to satisfy the user needs of the climber. Meanwhile, the second terminal apparatus can automatically end the climbing mode to reduce the energy consumption of the terminal apparatus as much as possible to ensure the battery life of the terminal apparatus to improve the climbing experience of the climber.

Figure 6:
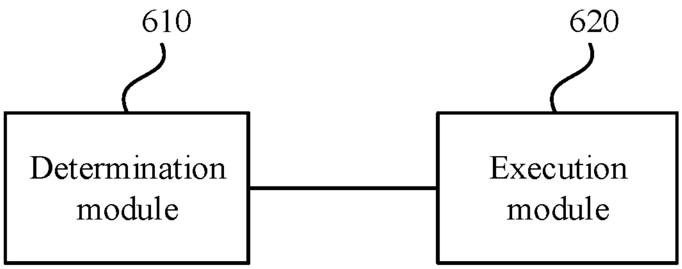
FIG. 6 is a schematic structural diagram of an automated climbing information acquisition device according to some embodiments of the present disclosure.

FIG. 6 is a schematic structural diagram of an automated climbing information acquisition device according to some embodiments of the present disclosure. The automated climbing information acquisition device of embodiments of the present disclosure can be suitable for automatically obtaining the climbing information during the climbing process. The device can be implemented by software and/or hardware. The device can be integrated in any apparatus having a function of automatically obtaining the climbing information. As shown in FIG. 6, the automated climbing information acquisition device includes a determination module 610 and an execution module 620.

The determination module 610 can be configured to, in response to the operation of obtaining the first target information sent by the first terminal apparatus, determine the relative information between the second terminal apparatus and the first terminal apparatus. The execution module 620 can be configured to, if the relative information satisfies the predetermined condition, automatically obtain the climbing information by the second terminal apparatus and perform the predetermined operation on the climbing information.

In some embodiments, the execution module 620 can be further configured to obtain the current position of the second terminal apparatus, determine the current position as the current rest point, determine the climbing segment between the current rest point and the previous rest point as the current climbing segment, and obtain the climbing information corresponding to the current climbing segment and the climbing information corresponding to the current climbing point.

In some embodiments, the climbing information corresponding to the current climbing segment can include the climbing time, the climbing difficulty coefficient, the current climbing trajectory, and the trajectory length corresponding to the current climbing trajectory. The climbing information corresponding to the current rest point can include the current climbing height and the rest time. The rest time can be the first duration in which the relative information meets the predetermined condition.

In some embodiments, the predetermined operation can include at least one of the storage operation, the statistical analysis operation, or the output operation.

In some embodiments, the first target information can include the identification number of the first terminal apparatus, the current position of the first terminal apparatus, or the current trajectory of the first terminal apparatus.

In some embodiments, the relative information between the second terminal apparatus and the first terminal apparatus can include at least one of the signal strength of the signal including the first target information received by the second terminal apparatus, the relative distance between the second terminal apparatus and the first terminal apparatus, and the cumulated trajectory length difference between the second terminal apparatus and the first terminal apparatus.

In some embodiments, the predetermined condition can include at least one of the first predetermined condition, the second predetermined condition, or the third predetermined condition.

In some embodiments, if the relative information includes the signal strength of the signal including the first target information received by the second terminal apparatus, the predetermined condition can include the first predetermined condition. The first predetermined condition can include the signal strength being greater than the first strength threshold. If the relative information includes the relative distance between the second terminal apparatus and the first terminal apparatus, the predetermined condition can include the second predetermined condition. The second predetermined condition can include the relative distance being less than the distance threshold. If the relative information includes the cumulated trajectory length difference between the second terminal apparatus and the first terminal apparatus, the predetermined condition can include the third predetermined condition. The third predetermined condition can include the cumulated trajectory length difference being less than the length threshold.

In some embodiments, the relative distance can include the straight-line distance between the second terminal apparatus and the first terminal apparatus or the height difference between the second terminal apparatus and the first terminal apparatus.

In some embodiments, the first predetermined condition can further include the second duration in which the signal strength is greater than the first strength threshold being greater than the first time threshold. The second predetermined condition can further include the third duration in which the relative distance is less than the distance threshold being greater than the first time threshold. The third predetermined condition can further include the fourth duration in which the cumulated trajectory length difference is less than the length threshold being greater than the first time threshold.

In some embodiments, the first predetermined condition can further include, within the predetermined time, the proportion of the second duration in which the signal strength is greater than the first strength threshold being greater than the first predetermined ratio. The second predetermined condition can further include, within the predetermined time, the proportion of the third duration in which the distance is greater than the distance threshold being greater than the second predetermined ratio. The third predetermined condition can further include, within the predetermined time, the proportion of the fourth duration in which the cumulated trajectory length difference is less than the length threshold being greater than the third predetermined ratio.

In some embodiments, the device can further include a mode activation module configured to, before obtaining the first target information sent by the first terminal apparatus, activate the climbing mode when receiving the activation instruction to allow the second terminal apparatus to obtain the first target information sent by the first terminal apparatus.

In some embodiments, the device can further include a mode exit module configured to exit the climbing mode when receiving an ending instruction or if the duration in which the relative information meets the predetermined condition is greater than the second time threshold, a mode pause module configured to pause the climbing mode when receiving the pause instruction to cause the second terminal apparatus to stop obtaining the first target information sent by the first terminal apparatus, and a mode resume module configured to continue the climbing mode when receiving the resume instruction to cause the second terminal apparatus to continue to obtain the first target information sent by the first terminal apparatus.

The device can be configured to perform the automated climbing information acquisition method of embodiments of the present disclosure and have similar functional modules and effects as the method.

Figure 7:
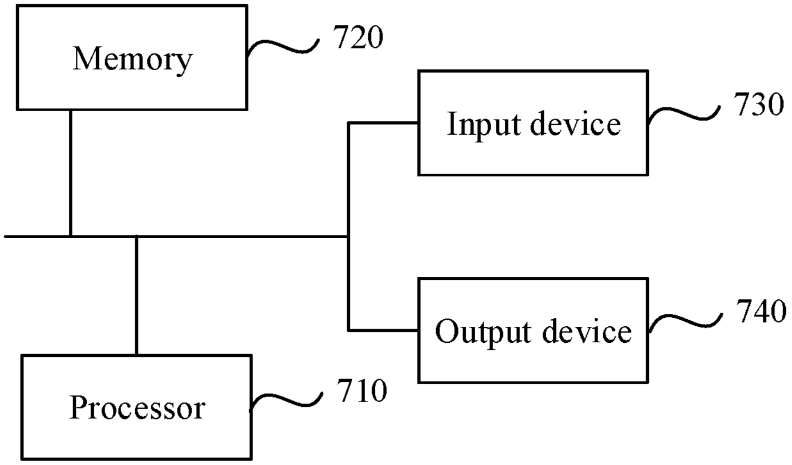
FIG. 7 is a schematic structural diagram of a terminal apparatus according to some embodiments of the present disclosure.

FIG. 7 is a schematic structural diagram of a terminal apparatus according to some embodiments of the present disclosure. As shown in FIG. 7, the terminal apparatus includes a processor 710, a memory 720, an input device 730, and an output device 740. The terminal apparatus can include one or more processors 710. For example, one processor 710 is provided in FIG. 7. The processor 710, the memory 720, the input device 730, and the output device 740 of the terminal apparatus can be connected through a bus or in another method. For example, FIG. 7 shows the connection through the bus.

The memory 720 can be a computer-readable storage medium, which stores a software program and a computer-executable program and module, e.g., the program instruction/module (e.g., the determination module 610 and the execution module 620 of the automated climbing information acquisition device) corresponding to the automated climbing information acquisition method ion of embodiments of the present disclosure. The processor 710 can perform a plurality of functional applications and data processing of the terminal apparatus by running the software program, instruction, and module stored in the memory 720. That is, the automated climbing information acquisition method can be implemented.

The memory 720 can mainly include a program storage area and a data storage area. The program storage area can store an operating system and an application needed by the at least one function. The data storage area can store the data created according to the application of the terminal. In addition, the memory 720 can include a high-speed random access memory (RAM) or a non-volatile memory, e.g., at least one of a magnet disk storage device, a flash device, or other non-volatile solid storage devices. In some embodiments, the memory 720 can include a memory remotely configured relative to the processor 710. The remote memory can be connected to the terminal apparatus through networks. The networks can include but are not limited to the Internet, Enterprise intranet, local area network (LAN), mobile communication network, and a combination thereof.

The input device 730 can be configured to receive input number or character information and input generating a key signal related to user settings and functional control of the terminal apparatus. The output device 740 can include a display apparatus such as a display or an audio broadcast apparatus.

Embodiments of the present disclosure provide a computer-readable storage medium storing a computer program that, when executed by the processor, causes the processor to implement the automated climbing information acquisition method of embodiments of the present disclosure to, in response to the first target information sent by the first terminal apparatus, determine the relative information between the second terminal apparatus and the first terminal apparatus, if the relative information satisfies the predetermined condition, cause the second terminal apparatus to automatically obtain the climbing information, and perform the predetermined operation on the climbing information.

Any combination of one or more computer-readable media can be adopted. The computer-readable medium can be a computer-readable signal medium or a computer-readable storage medium. The computer-readable storage medium, for example, can include but is not limited to electrical, magnetic, optical, electromagnetic, infrared, or semiconductor systems, devices, or components, or a combination thereof. For example, the computer-readable storage medium can include (non-exclusive list) an electrical connection having one or more conductive wires, a portable computer disk, a hard drive, a random access memory (RAM), a read-only memory (ROM), an Erasable Programmable Read-Only Memory (EPROM or flash memory), an optical fiber, a portable compact disk read-only memory (CD-ROM), optical storage components, magnetic storage components, or a combination thereof. Thus, the computer-readable storage medium can be any tangible medium that includes or stores a program. The program can be applied by or in connection with the instruction execution system, device, or component.

A computer-readable signal medium can include a data signal in a baseband or propagated as a part of a carrier wave, which carries computer-readable program code. The propagated data signal can have many forms, including but not limited to an electromagnetic signal, an optical signal, or a combination thereof. A computer-readable signal medium can also be any computer-readable medium other than the computer-readable storage medium. The computer-readable medium can send, propagate, or transmit a program used by or in connection with the instruction execution system, device, or component.

Program code included in a computer-readable medium can be transmitted in any appropriate medium, including but not limited to wireless, wire, optical cable, radio frequency (RF), or a combination thereof.

Computer program code for executing operations of the present disclosure can be written in one or more programming languages or a combination thereof. The programming languages can include object-oriented programming languages, such as Java, Smalltalk, C++, as well as conventional procedural programming languages, such as the "C" language or similar programming languages. The program code can be executed entirely on a user computer, partially on the user computer, as an independent software package, partially on the user computer and partially on a remote computer, or entirely on a remote computer or server. In cases involving the remote computer, the remote computer can be connected to the user computer through any type of network, including a Local Area Network (LAN) or Wide Area Network (WAN), or to an external computer (e.g., via the internet provided by an internet service provider).

What is claimed is:

1. An automated climbing information acquisition method comprising:

in response to obtaining target information sent by a first terminal apparatus, determining relative information between a second terminal apparatus and the first terminal apparatus, the first terminal apparatus and the second terminal apparatus being carried by a climber and a protector, respectively, the first terminal apparatus and the second terminal apparatus being communicated with each other through Bluetooth, broadcasting, near-field transmission, or Wi-Fi, the relative information being determined according to the communication between the first terminal apparatus and the second terminal apparatus, and the relative information between the second terminal apparatus and the first terminal apparatus including at least one of a signal strength of a signal including the target information received by the second terminal apparatus, a relative distance between the second terminal apparatus and the first terminal apparatus, or a cumulated trajectory length difference between the second terminal apparatus and the first terminal apparatus; and in response to the relative information satisfying a predetermined condition, controlling the second terminal apparatus to obtain climbing information and perform a predetermined operation on the climbing information, the predetermined condition including that the signal strength is greater than a strength threshold, that the relative distance is less than a distance threshold, or that the cumulated trajectory length difference is less than a length threshold, and the predetermined operation including a storage operation or a statistical analysis operation.

2. The method according to claim 1, wherein controlling the second terminal apparatus to obtain the climbing information includes:

obtaining a current position of the second terminal apparatus and determining the current position as a current rest point;

determining a climbing segment between the current rest point and a previous rest point as a current climbing segment; and obtaining climbing information corresponding to the current climbing segment and climbing information corresponding to the current rest point.

3. The method according to claim 2, wherein:

the climbing information corresponding to the current climbing segment includes climbing time, a climbing difficulty coefficient, a current climbing trajectory, and a trajectory length corresponding to the current climbing trajectory; and the climbing information corresponding to the current rest point includes a current climbing height and rest time, the rest time being a duration in which the relative information satisfies the predetermined condition.

4. The method according to claim 1, wherein the predetermined operation further includes an output operation.

5. The method according to claim 1, wherein the target information includes at least one of an identification number of the first terminal apparatus, a current position of the first terminal apparatus, or a current trajectory of the first terminal apparatus.

6. The method according to claim 1, wherein the relative distance includes:

a straight-line distance between the second terminal apparatus and the first terminal apparatus; or a height difference between the second terminal apparatus and the first terminal apparatus.

7. The method according to claim 1, wherein:

the predetermined condition further includes:

a first duration in which the signal strength is greater than the strength threshold being greater than a time threshold;

a second duration in which the relative distance is less than a distance threshold being greater than the time threshold; or a third duration in which the cumulated trajectory length difference is less than a length threshold being greater than the time threshold.

8. The method according to claim 7, wherein:

the predetermined condition further includes:

within a predetermined time, a proportion of the first duration being greater than a first predetermined ratio;

within the predetermined time, a proportion of the second duration being greater than a second predetermined ratio; or within the predetermined time, a proportion of the third duration being greater than a third predetermined ratio.

9. The method according to claim 1, further comprising, before obtaining the target information sent by the first terminal apparatus:

in response to receiving an activation instruction, activating a climbing mode to enable the second terminal apparatus to obtain the target information sent by the first terminal apparatus.

10. The method according to claim 9, further comprising:

in response to receiving an ending instruction or a duration in which the relative information satisfies the predetermined condition being greater than a time threshold, exiting the climbing mode;

in response to receiving a pause instruction, pausing the climbing mode to cause the second terminal apparatus to stop obtaining the target information sent by the first terminal apparatus; and in response to receiving a resume instruction, continuing with the climbing mode to cause the second terminal apparatus to continue to obtain the target information sent by the first terminal apparatus.

11. A terminal apparatus comprising:

one or more processors; and one or more memories storing one or more computer programs that, when executed by the one or more processors, cause the one or more processors to:

in response to obtaining target information sent by another terminal apparatus, determine relative information between the terminal apparatus and the another terminal apparatus, the another terminal apparatus and the terminal apparatus being carried by a climber and a protector, respectively, the terminal apparatus and the another terminal apparatus being communicated with each other through Bluetooth, broadcasting, near-field transmission, or Wi-Fi, the relative information being determined according to the communication between the terminal apparatus and the another terminal apparatus, and the relative information between the terminal apparatus and the another terminal apparatus including at least one of a signal strength of a signal including the target information received by the terminal apparatus, a relative distance between the terminal apparatus and the another terminal apparatus, or a cumulated trajectory length difference between the terminal apparatus and the another terminal apparatus; and in response to the relative information satisfying a predetermined condition, control the terminal apparatus to obtain climbing information and perform a predetermined operation on the climbing information, the predetermined condition including that the signal strength is greater than a strength threshold, that the relative distance is less than a distance threshold, or that the cumulated trajectory length difference is less than a length threshold, and the predetermined operation including a storage operation or a statistical analysis operation.

12. The terminal apparatus according to claim 11, wherein the one or more processors are further configured to:

obtain a current position of the terminal apparatus and determine the current position as a current rest point;

determine a climbing segment between the current rest point and a previous rest point as a current climbing segment; and obtain climbing information corresponding to the current climbing segment and climbing information corresponding to the current rest point.

13. The terminal apparatus according to claim 12, wherein:

the climbing information corresponding to the current climbing segment includes climbing time, a climbing difficulty coefficient, a current climbing trajectory, and a trajectory length corresponding to the current climbing trajectory; and the climbing information corresponding to the current rest point includes a current climbing height and rest time, the rest time being a duration in which the relative information satisfies the predetermined condition.

14. The terminal apparatus according to claim 11, wherein the predetermined operation further includes an output operation.

15. The terminal apparatus according to claim 11, wherein the target information includes at least one of an identification number of the another terminal apparatus, a current position of the another terminal apparatus, or a current trajectory of the another terminal apparatus.

16. A non-transitory computer-readable storage medium storing one or more computer programs that, when executed by one or more processors, cause the one or more processors to:

in response to obtaining target information sent by a first terminal apparatus, determine relative information between a second terminal apparatus and the first terminal apparatus, the first terminal apparatus and the second terminal apparatus being carried by a climber and a protector, respectively, the first terminal apparatus and the second terminal apparatus being communicated with each other through Bluetooth, broadcasting, near-field transmission, or Wi-Fi, the relative information being determined according to the communication between the first terminal apparatus and the second terminal apparatus, and the relative information between the second terminal apparatus and the first terminal apparatus including at least one of a signal strength of a signal including the target information received by the second terminal apparatus, a relative distance between the second terminal apparatus and the first terminal apparatus, or a cumulated trajectory length difference between the second terminal apparatus and the first terminal apparatus; and in response to the relative information satisfying a predetermined condition, controlling the second terminal apparatus to obtain climbing information and perform a predetermined operation on the climbing information, the predetermined condition including that the signal strength is greater than a strength threshold, that the relative distance is less than a distance threshold, or that the cumulated trajectory length difference is less than a length threshold, and the predetermined operation including a storage operation or a statistical analysis operation.

* * * * *